(12) United States Patent
Holzkämper et al.

(10) Patent No.: US 10,534,346 B2
(45) Date of Patent: Jan. 14, 2020

(54) TERMINAL FOR PROCESSING FACILITIES

(71) Applicant: SIG Technology AG, Neuhausen am Rheinfall (CH)

(72) Inventors: Peter Holzkämper, Baesweiler (DE); Thomas Hofmann, Osnabruck (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 257 days.

(21) Appl. No.: 15/504,524

(22) PCT Filed: Jul. 1, 2015

(86) PCT No.: PCT/EP2015/064949
§ 371 (c)(1),
(2) Date: Feb. 16, 2017

(87) PCT Pub. No.: WO2016/026601
PCT Pub. Date: Feb. 25, 2016

(65) Prior Publication Data
US 2017/0235296 A1    Aug. 17, 2017

(30) Foreign Application Priority Data

Aug. 20, 2014  (DE) ........................ 10 2014 012 185

(51) Int. Cl.
| | | |
|---|---|---|
| *G05B 15/00* | (2006.01) | |
| *G05B 19/409* | (2006.01) | |
| *G06F 1/16* | (2006.01) | |
| *G06F 3/0484* | (2013.01) | |
| *B65B 17/00* | (2006.01) | |

(Continued)

(52) U.S. Cl.
CPC ............ *G05B 19/409* (2013.01); *B65B 17/00* (2013.01); *G06F 1/1694* (2013.01); *G06F 3/0346* (2013.01); *G06F 3/04847* (2013.01); *B65B 57/00* (2013.01); *G05B 2219/32014* (2013.01); *G05B 2219/36159* (2013.01); *G05B 2219/36542* (2013.01); *G05B 2219/39449* (2013.01)

(58) Field of Classification Search
CPC ..................................................... B65B 57/00
USPC ......................................................... 700/83
See application file for complete search history.

(56) References Cited

U.S. PATENT DOCUMENTS

| | | |
|---|---|---|
| 7,298,385 B2 | 11/2007 | Kazi et al. |
| 9,537,844 B2 | 1/2017 | Schüepp |

(Continued)

FOREIGN PATENT DOCUMENTS

| | | |
|---|---|---|
| CN | 102265242 A | 11/2011 |
| DE | 102010001019 A1 | 7/2011 |

(Continued)

*Primary Examiner* — Md Azad
(74) *Attorney, Agent, or Firm* — The Webb Law Firm (57) ABSTRACT

Terminal 20 for processing facilities having a communication device 28 arranged to exchange information about the processing facility with a communication partner, a screen 22 arranged to display the information about the processing facility, a position sensor 26 arranged to collect alignment information relating to an alignment of the terminal 20 and a processor 24 arranged to control the communication device 28, the screen 22 and the position sensor 26. The functionality of the terminal is extended by the fact that the processor sets a function of the terminal 20 dependent on alignment information from the position sensor 26.

16 Claims, 4 Drawing Sheets

(51) Int. Cl.
    *G06F 3/0346*     (2013.01)
    *B65B 57/00*     (2006.01)

(56) References Cited

U.S. PATENT DOCUMENTS

| | | | |
|---|---|---|---|
| 2002/0180604 A1* | 12/2002 | Yamaashi | G01S 5/0027 340/573.1 |
| 2009/0303204 A1 | 12/2009 | Nasiri et al. | |
| 2010/0214216 A1* | 8/2010 | Nasiri | A63F 13/06 345/158 |
| 2013/0231757 A1 | 9/2013 | Rother | |
| 2013/0335203 A1 | 12/2013 | Sun et al. | |
| 2015/0205287 A1* | 7/2015 | Igarashi | B23Q 1/0045 318/591 |
| 2015/0212718 A1 | 7/2015 | Kellhammer et al. | |
| 2015/0365492 A1* | 12/2015 | Kalan | G06Q 10/0637 700/83 |
| 2016/0283443 A1* | 9/2016 | Michalscheck | G05B 19/406 |

FOREIGN PATENT DOCUMENTS

| | | |
|---|---|---|
| DE | 102012002657 A1 | 8/2013 |
| DE | 102012010721 A1 | 12/2013 |
| DE | 102012019347 A1 | 4/2014 |
| EP | 1447770 A2 | 8/2004 |
| EP | 2711796 A1 | 3/2014 |
| FR | 2990286 A1 | 11/2013 |
| WO | 2014044608 A1 | 3/2014 |

\* cited by examiner

TERMINAL FOR PROCESSING FACILITIES

CROSS REFERENCE TO RELATED APPLICATIONS

This application is the United States national phase of International Application No. PCT/EP2015/064949 filed Jul. 1, 2015, and claims priority to German Patent Application No. 10 2014 012 185.2 filed Aug. 20, 2014, the disclosures of which are hereby incorporated in their entirety by reference.

BACKGROUND OF THE INVENTION

Field of the Invention

The subject matter relates to a terminal for processing facilities and to a system having a terminal and a processing facility, as well as to the use of a terminal for a processing facility.

Description of Related Art

Present-day processing facilities (also known as units) in the manufacturing industry, for example production facilities, production lines, packaging facilities, filling facilities or the like, are getting more complex. The requirements, regarding hygiene for example, are getting stricter and stricter due to statutory provisions. The dimensional accuracy and process reliability requirements have also been increased by product purchasers. A trouble-free production process must always be guaranteed, in which, in addition, traceability and monitorability of production processes and possible errors are required.

In order to maintain a trouble-free production flow and in order to be able to trace production steps, a large number of sensors are usually installed in the processing facilities. A processing facility usually has an infeed channel, through which a raw material is introduced into the installation, at least one processing station, in which the raw material is processed, and an outfeed channel, from which the processed product is output. A plurality of processing stations can be arranged sequentially one after another within a processing facility and in this way form a production line.

For operational safety reasons, processing facilities (also known as processing installations, processing units) are usually protected by covers. These covers, as a general rule, prevent a manual intervention, which involves a considerable risk of injury, from taking place during the production process. In addition, a covering at a processing station can become necessary for hygienic reasons. Finally, a cover (covering) of the processing station prevents production waste products from being released in an uncontrolled manner from the processing station into the surroundings. A covering (casing) does not always have to completely encase the processing station. It suffices if the covering is arranged like a wall or a tunnel between an operator of the processing station and the actual processing means of the processing station.

Usually, a viewing window is fitted in the covering. This can extensively form a part of the covering or can be arranged as an opening in the covering. The viewing window is preferably made from a transparent material and serves, on the one hand, as mechanical protection for the operator and, on the other hand, as a means for visually monitoring the processing process. With processing stations, the viewing window usually serves as a means for visually monitoring the processing process. The covering normally obstructs a clear view of the processing station, with the result that the viewing window is provided in the covering, through which the operator can look behind the covering into the processing station. The viewing window is usually made from a visually transparent material and is arranged in the covering in such a way that an operator has a clear view of the processing station or the components essential for the production process there.

In the packaging industry, in particular in filling facilities (installations), processing stations arranged one after another can comprise, for example, an unfolding unit, a sterilisation unit, a filling unit and a closing unit. Here, for example, a package sleeve is firstly unfolded in the unfolding unit. Then, for example, a bottom of the package sleeve is closed and the unfolded package sleeve which is only open on one side is sterilised in a sterilising unit. Subsequently, the foodstuff can be filled into the sterilised unfolded package in an aseptic chamber. Afterwards, the package can be closed on the remaining open side. During its passage through the processing facility the package is moved from processing station to processing station by means of a conveying device, for example a conveyor belt. At least one viewing window can be provided in the covering at each processing station. The viewing window is arranged in such a way that it at least partly unblocks the view of the processing process or the operating means of the processing station. Of course, the processing stations mentioned can also be part of a system of the subject matter described below.

As has already been explained in the introduction, the number of sensors within a processing station is constantly increasing. Monitoring of the production processes is becoming more and more continuous and the processing steps are constantly becoming more complex. This results in a large number of parameters and states, such as temperature, pressure, throughput volume, speed, angular speed, distances or suchlike having to be monitored by sensors respectively suitable for this purpose. Temperature sensors, pressure sensors, throughput measuring devices, speed indicators, hygrometers, manometers, distance sensors, proximity sensors, photoelectric sensors, voltmeters, ammeters, cameras or suchlike can, for example, be used for this purpose. All these sensors supply actual-state data for respective parameters of the processing station. Of course, the sensors mentioned can also be part of a system of the subject matter described below.

For the operator, it is becoming steadily more complicated to monitor the whole processing station, so that he or she is able to intervene in the case of an error and correct the error. Since a large number of parameters must be monitored and set for the production process and a combination of erroneous parameters can lead to an unwanted outcome, the operator must be given the possibility of being able to monitor and/or readjust the parameters as easily as possible. To that end, nowadays the operator is informed in a user manual which parameters must be in which value ranges and how the parameters are to be monitored.

In the case of an error, the operator must consult the user manual, so that he or she can possibly correct the error himself or herself. If he or she is not able to do this, he or she must call in a technician qualified for this purpose, which unnecessarily halts the production process. As long as the error is not corrected, the whole processing facility stands idle.

In order to simplify the production process, it would be helpful to make means available to the operator for monitoring the parameters of the processing station. Hence, the subject matter was based on the object of improving the operability of processing stations.

SUMMARY OF THE INVENTION

Nowadays, the operator has to look at information about the processing station on a monitor which is mounted next to the processing station. This is usually laborious and the operator is forced to remain in situ at the processing station while he or she reads the state data. In addition, instructions can be output which can be understood as information about the processing station. Such instructions can, for example, be operator instructions or repair instructions.

It is much more convenient if the operator is also able to monitor the processing station mobilely. It is namely the aim of every human-machine interface (HMI) to shorten the communication paths and make them more straightforward. The better and more unambiguous the communication at the HMI is, the easier the operation is for the operator.

Therefore, it is proposed according to the subject matter that the mentioned and further information is displayed where it is really required, namely on the terminal. Information such as numeric values, warnings, instructions, warning messages or error messages are arranged in such a way that they can be read quickly, straightforwardly and comprehensibly by the operator. The operator can be provided with a lot of information in an uncomplicated and easily comprehensible manner by means of the terminal according to the subject matter. The available display area is optimally utilised by the solution according to the subject matter.

In particular, firstly information about the processing facility is exchanged with a communication partner by the communication device. The communication partner can, for example, be the processing facility itself which transmits information, in particular state information, to the communication device. A communication server or a central data collection point can also be present which collects information about different processing facilities and makes it available to the terminal preferably as a response to a query.

The information made available is displayed on a screen of the terminal. Here, it can be understood that not all of the information can be displayed on the screen at the same time. The type of information is also possibly such that it has to be displayed in a certain format in order for it to be comprehensible to the operator. Therefore, in order to be able to present the information to the operator in a way which is comprehensible it can depend on which alignment the terminal has. Furthermore, if a display of information takes place which is dependent on the alignment, the screen is utilised in an optimum way, since different information can be made available in different alignment positions and hence more information can be displayed on a screen than is usual.

It is proposed that a position sensor is provided in the terminal for this purpose. Alignment information regarding an alignment of the terminal can be collected by means of the position sensor. Here, it can be detected, for example, whether the usually rectangular screen of the terminal is aligned horizontally or vertically. With a horizontal alignment, in so-called "landscape" mode, the longer edge of the screen runs essentially along, in particular essentially parallel to the horizontal. With a vertical alignment, in so-called "portrait" mode, the longer edge of the screen runs essentially along, in particular essentially parallel to the vertical.

It is also possible to detect whether the terminal or the plane of the screen of the terminal runs in a plane parallel to the surface or runs in a plane which is inclined to the surface. It can be detected which position the terminal has taken up by means of the alignment sensor. Here, preferably a differentiation is made between at least two main positions which are different from one another. In particular, this can be a horizontal or vertical alignment. Depending on what the position of the terminal is, it can be decided whether this is rather a horizontal alignment or a vertical alignment or a "landscape" or a "portrait" alignment and corresponding alignment information output.

In the terminal, a processor is arranged which controls both the communication device and the screen and the position sensor. Of course, the processor can consist of a plurality of independent process cores as well as a plurality of independent microchips which are configured for their respective tasks.

By means of the processor, it is possible to evaluate the alignment information collected by the position sensor and dependent on the evaluation result, and hence dependent on alignment information from the position sensor, it is possible to set a function of the terminal. The processor can set the function of the terminal both with respect to the display on the screen and, for example, with respect to the release of objects, access authorisation and the visibility of objects or suchlike. Therefore, the terminal of the subject matter provides the operator with functions which are dependent on the alignment information from the position sensor. The terminal provides an increased number of functions due to the fact that different functions can be set by the processor in at least two different positions of the terminal.

According to one embodiment, it is proposed that the processor sets the type of the information displayed on the screen about the processing facility dependent on the alignment information from the position sensor. Here, it is possible to set the way of presenting the information dependent on the alignment information. It is also possible to set the depth of detail of the displayed information dependent on the alignment information. Thus, it is e.g. possible to change from a symbol-based display to a text-based display, depending on which position the terminal is in. By way of example, a symbol is displayed in landscape mode. If the terminal is rotated and brought into portrait mode, text information, in particular text information assigned to the symbol can be displayed on the screen.

The content of the information displayed on the screen about the processing facility can also be set by the processor dependent on the alignment information from the position sensor. For example, in a first position it is possible to display a flow chart and in a second position descriptions of the process which are assigned to this flow chart. It is also possible for an image of a sensor or of a processing means to be displayed in a first position and for an operator instruction or a setting instruction for the processing means or the sensor to be displayed in a second position.

According to one embodiment it is proposed that the function of the terminal comprises at least controlling the processing facility. Here, it is possible, for example, to set individual processing means of the processing facility with respect to their parameters. In this way, for example, a rotational speed, a throughput speed, a throughput volume, a temperature, a voltage, a force or suchlike can be set for the processing means.

It is also possible for parameters of the facility to be displayed by means of the terminal. Parameters of the facility can, for example, be state data of the processing station which are measured by sensors. It is also possible for information derived therefrom to be displayed as parameters of the facility. In particular, the sensors mentioned at the outset are qualified for this purpose.

The state data of the processing station measured by the sensors are evaluated. On the basis of the evaluation, information can be acquired about the state of the processing station. In the process, it can be established whether all parameters are in the permitted range and the state of the processing station is normal. Furthermore, it can be determined if values of parameters are changing in the direction of unpermitted values. The speed of the change in value can be evaluated and it can concluded from this how probable it is that a parameter will depart from a permissible value range in the future. It can also be determined if a parameter which is not essential for production has departed from a permissible value range. This information can be used to output a warning message. If a parameter which is critical for production departs from a permissible range an error message can be output.

According to one embodiment, it is possible to provide a view of operator instructions by means of the terminal. During operation, it is necessary for the operator to manually readjust the processing facility with respect to individual parameters. In order to be able to carry out this readjustment, the operator has to know how he or she is to do this. This information can be provided in the operator instructions. It is also possible that in the case of an error an operator instruction follows which, however, instructs the operator how to correct the error.

It is also possible for information to be exchanged with the processing facility by means of the terminal. This can be a sending and a receiving of information of the processing facility. In particular, the operator can receive such information from the processing facility which is displayed on a display terminal of the processing facility. Here, it is possible, for example, for operator instructions, installation parameters or other state data of the processing station to be displayed in the viewing window of the processing facility. This information can now be transmitted from the processing facility to the terminal and displayed there. It is also possible that on the terminal certain information is displayed on the screen. With a touch/gesture or a corresponding manipulation of the terminal, the content of this display can be transmitted to the processing facility. There, the information can be e.g. visually displayed in the viewing window. Thus, it is, for example, possible for the information displayed on the screen to be made more easily accessible to a plurality of persons by overlaying it in the viewing window of the processing facility. For this purpose, the terminal sends the corresponding information to the processing facility, which enables the processing facility or the display device arranged there to display this information in the viewing window.

According to one embodiment, it is proposed that the processor, dependent on an access authorisation of a user currently logged into the terminal or dependent on a role (function) of a user logged into the terminal, sets the setting of the function of the terminal dependent on the alignment information. According to the subject matter, the function of the terminal is dependent on the alignment information. In a first position, a mere display of information can take place, for example, and in a second different position setting of installation parameters can be enabled. Whether and/or how these changes in the function of the terminal dependent on the alignment information take place can be dependent on an access authorisation of the logged-in user and/or on the role of the user logged into the terminal.

A machine operator can, for example, only be authorised to monitor facility parameters. In this case, only the state data and the operator instructions would be displayed in all positions of the terminal. A shift leader, on the other hand, is also authorised, for example, to change machine parameters. In this case, that is to say, dependent on his or her access authorisation, in at least one position of the terminal the function would be such (in contrast to the machine operator) that operating parameters could be changed via the terminal.

A distinction can also be made between internal and external access authorisation. In this way, it is possible, for example, for external service technicians only to have access to machine parameters, in order to set the machine so that it operates in an optimum way, but internal machine operators are able to access other operating data. The terminal can be equipped with different functions dependent on the access authorisation. Depending on what the access authorisation is, the function changes dependent on the alignment information.

The role (also called function) of a user currently logged into the terminal can also be decisive in how the function is set dependent on the alignment information. An identical role can be assigned to a plurality of users. Therefore, a plurality of users can have the role of a machine operator. This makes sense, for example, when in shift operation a plurality of persons can work as machine operator. All these persons have the role of a machine operator. The same, of course, also applies for service technicians or shift leaders or suchlike. Various persons who operate in the same position can all be assigned the same role. Depending on this role, the function of the terminal can then be set dependent on the alignment information.

Remote access to the terminal is also possible. However, this can, for example, be restricted in such a way that the processor only enables remote access via a data network with certain alignments of the terminal. As long as the terminal is in portrait mode, for example, remote access to the terminal can be blocked. Remote access can then, for example, be enabled only after the terminal has been rotated e.g. into landscape mode. This ensures that the person who is holding the terminal in his or her hand can decide whether the terminal can be remotely accessed. Whether remote access is possible or not depends on how the terminal is aligned.

In order to establish who is operating the terminal at a given time, access information must be collected. For this purpose, it is firstly necessary to read login information. An access authorisation can be derived from this login information which consists, for example, of a login name and a password. In order to read the login information, the terminal can, for example, comprise a login device. Such a login device can e.g. be arranged to receive login information wirelessly or to read biometric information e.g. by means of a fingerprint scanner. Near-field transmitters and receivers, which are suitable for reading near-field transponders, are particularly useful for wireless communication. Login information can be stored in the transponders. Depending on which transponder is in the proximity of the terminal, other login information is read and access authorisations derived from it. As mentioned above, these can then be relevant, for example, for the function of the terminal in a respective alignment.

According to one embodiment, it is proposed that the terminal is mobile relative to the processing facility. In this case, it is advantageous if the communication device is arranged to communicate wirelessly with the processing facility. A mobile terminal makes the, e.g. the machine operator, particularly flexible, in particular if a plurality of processing facilities are monitored at the same time.

According to one embodiment, it is proposed that the terminal is at least partly transparent in the area of the screen. In this way, the user could look through the terminal or the screen to the processing facility. If information regarding the processing facility is then overlaid on the screen, this is so-called "augmented reality". In order to adapt the information displayed on the screen, whereupon the operator looks through the screen, it is advantageous if the terminal has a camera facing away from the screen. It is also possible to display on the screen the picture taken by the camera. This picture can be enhanced with state information and other information regarding the processing facility, so that the current picture of the processing facility is enhanced with state data and hence the operation of the processing facility is made easier for the operator.

According to one embodiment, it is proposed that the information displayed on the screen is set dependent on a relative position of the terminal to the processing facility. Information about the processing station can be transmitted to the mobile information unit (terminal) dependent on the position of the mobile information unit (terminal) relative to the processing station. The terms mobile information unit and terminal mean the same. If an operator is at a processing station, the information about the processing stations can be transmitted to the mobile information unit. For example, it is possible for information with a low information quantity, for example just symbols, to be displayed in the viewing window. The specific instructions or error descriptions can then be additionally transmitted to the mobile information unit. The operator who is at a viewing window, in which a warning symbol or an error symbol is displayed, can additionally retrieve information via his or her mobile information unit and intervene accordingly in the production process.

Furthermore, an operator instruction can be received from the mobile information unit and by means of the display device can be displayed in the viewing window. Here, it is possible, for example, for an operator instruction or direction to be generated remote from the processing station, which is then transmitted to the mobile information unit. The operator can then transmit this information from the mobile information unit to the viewing window and gets this operator instruction displayed to him or her directly in his or her field of vision. It is hereby possible to display to the operator in his or her field of vision what is to be done and how, in order to make the processing station run smoothly in terms of production.

According to one embodiment, it is proposed that the information displayed on the screen is set dependent on information displayed by a display device in a viewing window of the processing facility. The processing facility can display information in the viewing window by means of a display device. This information can contain operator instructions, state data or warning messages and error messages or suchlike. A display can take place on the screen depending on what is displayed in the viewing window. Thus, it is possible, for example, that only a warning message or an error message is displayed as a symbol in the viewing window and a specific instruction for this is displayed on the screen. Preferably, the information displayed on the screen is semantically associated with the information displayed in the viewing window. In this way, the information displayed in the viewing window can be enhanced by the information displayed on the screen.

It is also possible to represent the information about the processing station as icons/symbols. A temperature display can, for example, contain a pictorially represented thermometer. The actual temperature can be displayed as a bar on the thermometer. If the actual temperature exceeds a permissible range, the thermometer can, for example, be coloured red. In the case of a pressure value, an impermissible overpressure, for example, can be represented by a corresponding symbol. The symbols for representing the information about the processing station are selected such that they are immediately understandable to the operator.

A processing facility can have one or more processing stations. The processing stations process packaging material, for example, in which they form it into packages and fill them with contents, such as foodstuffs. Different operating means, for example folding units, sterilisation units, filling units, closing units, conveying units, printing units, measuring units or suchlike, interact with one another in different processing steps and process a packing material and a filling material into a filled package.

Starting from an infeed channel and ending with an outfeed channel, a filled package is created from an unfolded package sleeve. During this processing, the product passes through various processing stations and it is proposed that information about the processing station is displayed in the viewing window. A viewing window can be assigned to a processing station. This viewing window serves to enable the operator to visually monitor the processing process of the processing station, in which he or she can look through the viewing window at the operating means of the processing station. The visual information obtained can be enhanced by overlaying or displaying further information in the viewing window. By displaying information about the processing station, "augmented reality" is created. Information can be displayed to the operator as operator instructions, operating data, control data, operating parameters or suchlike. In addition, instructions for correcting errors or preventing errors can be displayed. Corresponding information can also be alternatively or additionally displayed on the terminal.

A further aspect is a system having a terminal and a processing facility having at least one processing station.

With this system, preferably a covering at least partly surrounds the processing station. Preferably, at least one viewing window can be arranged in the covering of the processing station. Information can be displayed in the viewing window by means of a display device of the processing station. This information, which can be displayed in the viewing window, can, as already described above, be exchanged between the terminal and the processing station. It is also possible to control the terminal dependent on its alignment in such a way that information semantically associated with the information in the viewing window is displayed. It is also possible to transmit information from the screen of the terminal to the viewing window by firstly transmitting the information from the terminal to the processing station and then displaying it in the viewing window by means of the display device.

According to one embodiment, it is proposed that the communication device is connected to the display device of the processing station in such a way that the information displayed on the screen is dependent on information displayed in the viewing window by the display device. Here, it is possible, for example, to show detailed information on the screen about the instructions which are displayed in the viewing window. It is also possible to show just a warning message on the screen and detailed information associated with this in the viewing window. It is also possible for the information displayed in the viewing window by the display device to be dependent on the information displayed on the screen.

A use of a terminal for processing facilities, in particular for filling facilities, is a further aspect. The number of parameters to be monitored is substantial especially in filling facilities and support for an operator is particularly advisable.

BRIEF DESCRIPTION OF THE DRAWING(S)

The subject matter is explained in more detail below with the aid of the figures illustrating exemplary embodiments. In the Figures show.

DETAILED DESCRIPTION OF THE INVENTION

Figure 1:
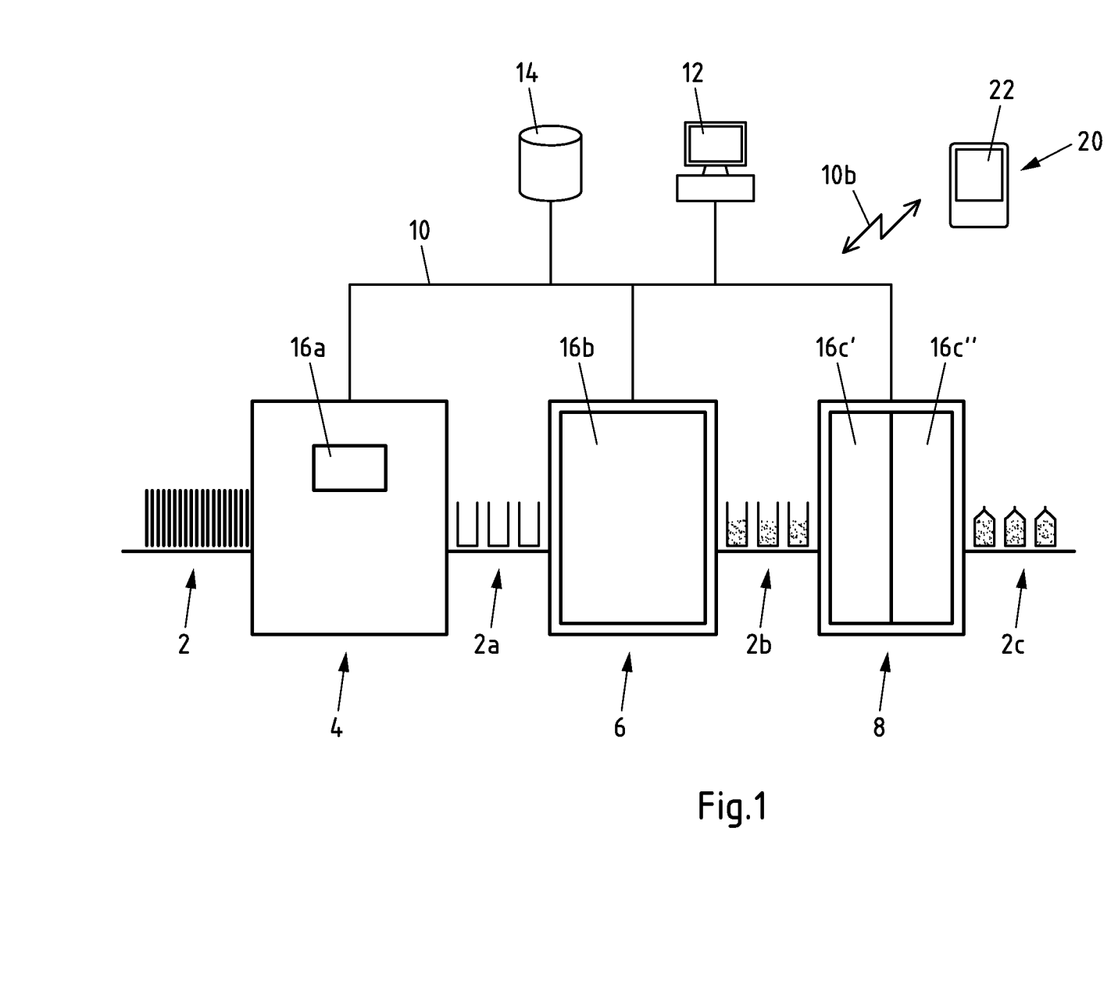
FIG. 1 the schematic structure of a filling installation.

The representation of information about the state of a processing facility according to the subject matter can be demonstrated, by way of example, at a filling facility. In a filling station, for example for foodstuffs, package sleeves 2 produced from packaging material are firstly fed into an unfolding device 4. In the unfolding device 4, the package sleeves 2 initially folded flat together are unfolded and closed on one side.

The unfolded package sleeves 2*a* are then conveyed to a filling device 6. The foodstuff is filled into the unfolded package sleeves 2*a* in the filling device 6.

The package sleeves 2*b* filled by the filling device 6 are then conveyed to a closing unit 8. In the closing unit 8, the gables of the filled package sleeves 2*b* are closed, for example by welding/sealing the gable edge. The closed, filled packages 2*c* are then fed out of the closing unit 8.

Of course, the above representation of a filling facility is purely schematic. Notably, no sterilisation unit, for example, is provided. A sterilisation unit can be present in the filling facility 6. It is also possible for the devices to be encased in a common housing, in particular the filling device 6 and the closing unit 8 can be encased together in a housing in a sterilisation area. Other stations can be part of a filling facility, but for a clearer overview they are not represented.

It can be seen in FIG. 1 that each of the devices 4-8 is connected to a control computer 12 and a database 14 via a data link 10 (communication link). The data link 10 can be a wired LAN connection for example. Wireless connections can also be implemented, for example by means of WLAN. It is also possible for a mixture of different types of data links 10 to be used.

The devices 4-8 receive control instructions from the control computer 12, by means of which the operating means can be hydraulically, pneumatically and/or electrically operated according to the predefined rules. Inside the devices 4-6, parameters of the operating means are detected by means of various sensors, as already described above by way of example. The collected state data, that is to say, the values of the respective parameters, are transmitted by the sensors of the devices 4-8 to the control computer 12 and/or to the database 14. In the database 14, a complete record for each batch from package sleeves 2*a* to the filled packages 2*c* relating to the respective parameters can be reproduced. The control computer 12 evaluates the operating parameters and applies control rules, in order to correspondingly control the devices 4 to 6.

Also this description of the control of the devices 4 to 8 is purely by way of example and purely schematic. For the subject matter, it can just be important that with the aid of the parameters detected by sensors, operating states of the devices 4 to 8 are determined by means of the control computer 12 and/or by means of the database 14 and, dependent on the operating states, instructions, indications, warnings or error messages or any other information about the processing station are generated for an operator of the devices 4 to 8 and subsequently displayed e.g. on the terminal. Directions, operator instructions, warnings, error messages and operating data can, according to the subject matter, be visually presented to the operator by means of overlays in viewing windows, which are in any case present in coverings of the devices 4 to 8, or on the screen of the terminal.

In FIG. 1, it can be identified that for example in the unfolding device 4 a viewing window 16*a* is provided. The viewing window 16 is integrated like a window into the covering of the unfolding device 4. For example, the covering of the unfolding device 4 can have a front door, into which the viewing window 16*a* is integrated. This door can be opened, in order to gain access to the operating means of the unfolding device 4.

The filling device 6 has an extensive viewing window 16*b* which almost occupies the whole area of a door of the covering of the filling device 6. The operator can view the complete filling device through this viewing window and receive further information about the filling device 6 via the viewing window 16*b*.

The closing device 8 has two sliding doors, each of which has a viewing window 16*c*', 16*c*" respectively. Each of the viewing windows 16*c*', 16*c*" can be slid along a sliding groove guide, so that by sliding the viewing windows 16*c*', 16*c*" to the right or to the left the operator has access to the operating means of the closing device 8.

Of course, the illustrated viewing windows 16*a* to 16*c* purely serve as examples. A viewing window consisting of glass, plexiglass or another transparent or semi-transparent material can be provided in a covering which can be arranged as a surrounding housing or only as a mechanical protection at a device 4 to 8. The operator can view the operating means of the respective device 4-8 via this viewing window 16*a*-16*c*. In addition, according to the subject matter of the invention, the operator receives additional information about the respective devices 4 to 6 via the viewing windows 16*a*-16*c*. Such additional information is overlaid in the viewing windows 16*a*-16*c*.

In addition to the viewing windows 16*a*-16*c*, it is possible to generate instructions, indications, warnings or error messages and any other information about the processing station for an operator of the device 4-8 and then display them on a terminal 20. The terminal 20 has a communication link to the data link 10, the control computer 12, the database 14 and the devices 4 to 8 via a preferably wireless communication link 10*b*. All information which can be displayed in the viewing windows 16*a*-16*c* can also be displayed on the screen 22 of the terminal 20. It is also possible, as will be described below, to exchange the information displayed on the screen 22 with the viewing windows 16a-16c, so that information on the screen 22 can be displayed in the viewing windows 16a-16c and vice-versa. For this purpose, an exchange of corresponding data between the terminal 20 and the control computer 12 or the devices 4-8 is necessary.

Figure 2:
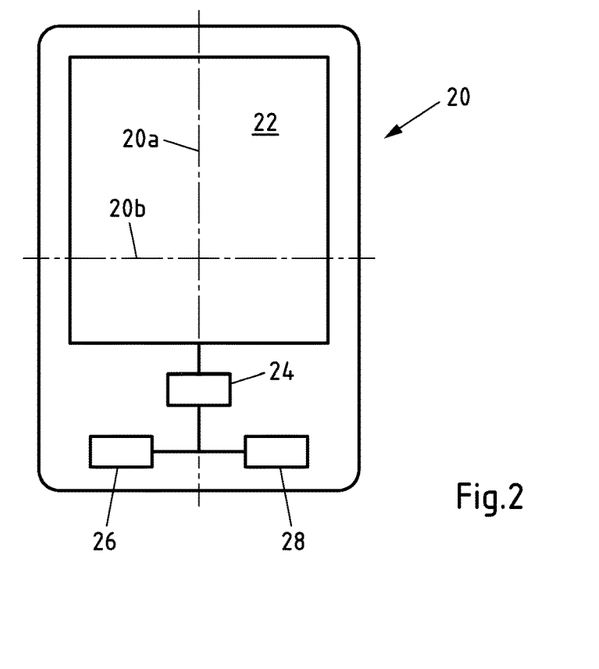
FIG. 2 a schematic view of a terminal.

In addition to the exchange of information which is displayed on the screen 22 of the terminal 20, the terminal has other functions which are illustrated by way of example in FIG. 2.

The terminal 20 is schematically illustrated in FIG. 2. Firstly, the terminal 20 has a screen 22. This can be partly transparent or consist of a semi-transparent material, so that the screen 22 can both be looked through and information can be displayed on the screen 22. A processor 24 is operatively connected to the screen 22 and is also operatively connected to a position sensor 26 and a communication device 28. It is possible to detect the position of the terminal 20 via the position sensor 26. Here, it is possible, for example, to detect the position of the longitudinal axis 20a and the position of the transverse axis 20b of the terminal 20. If the longitudinal axis 20a is, for example, in the vertical, portrait modus can be applied and if the position of the longitudinal axis 20a is in the horizontal, i.e. in the shown position rotated by 90°, landscape mode can be activated. The position sensor 26 can e.g. be a gyroscope.

Depending on the alignment information from the position sensor 26, the processor 24 can vary the function of the terminal 20, in particular the information displayed on the screen 22.

Figure 3A:
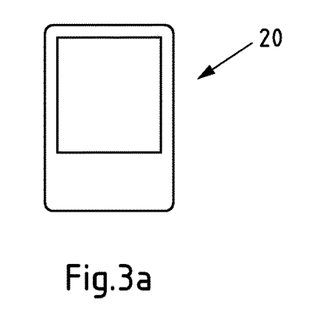
FIGS. 3*a*-*c* different positions of the terminal.
Figure 3B:
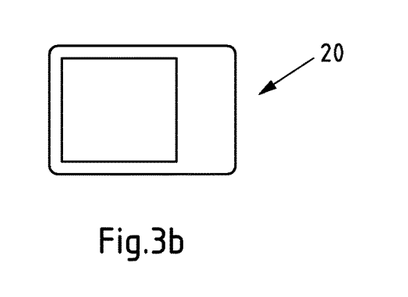
Figure 3C:
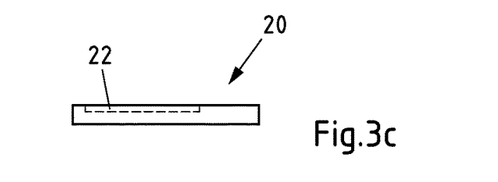

Different positions of the terminal 20 are illustrated in FIGS. 3a-3c. In FIG. 3a, the terminal 20 is in an upright position and portrait mode can be activated. In FIG. 3b, the terminal 20 is in a sideways position and it can be operated in landscape mode. FIG. 3c shows the terminal 20 lying on its rear side with the screen 22 pointing upwards. A specific function can be activated by the processor 24 in this position too.

The positions shown according to FIGS. 3a-3c are purely by way of example. The spatial position in particular of the axes 20a or 20b can be detected by the position sensor 26 and, dependent on the detected position of the alignment sensor 26, the processor 24 can control the function of the terminal 20.

Figure 4:
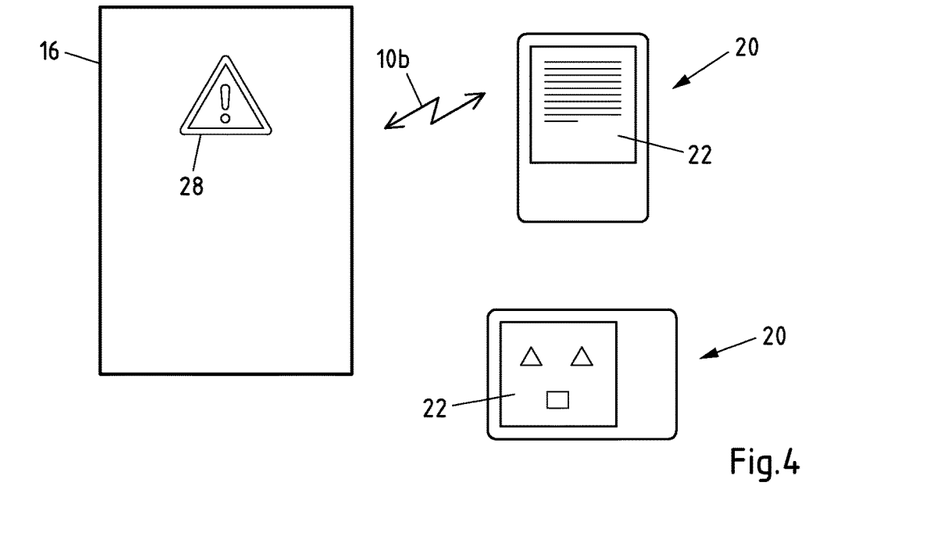
FIG. 4 a schematic view of a terminal together with a viewing glass.

FIG. 4 shows an exemplary control process dependent on the alignment information. A warning message is, for example, displayed in a viewing window 16a as symbol 28. The information that the symbol 28 is displayed in the viewing window 16 is transmitted from the device 4 via the data link 10, and in particular via the wireless connection 10b, and is received, for example, by the communication device 28 of the terminal 20. The position sensor 26 has recognised that the terminal 20 is in the position according to FIG. 3a, for example, and therefore the processor 24 operates the terminal 20 in portrait mode. This can be recognised in the upper illustration of the terminal 20. In this mode, the terminal 20 is e.g. operated in such a way that dependent on information displayed in the viewing window 16 operator instructions are displayed in text format on the screen. This is schematically illustrated here.

If the terminal 20 is now rotated from the position illustrated above into the position illustrated below, the processor 24 changes the mode from portrait mode to landscape mode. The processor 24 can be programmed in such a way that at that moment the information displayed on the screen 22 is changed. Here, the information associated with the symbol 28, for example, is retained, but the content of the information is changed. Thus, in the lower illustrated position of the terminal 20 an operator instruction is output on the screen 22. This can, for example, take place in the form of images which specify to the operator how he or she has to adjust e.g. the unfolding device 4, in particular how he or she must adjust various sensors and actuators there, so that the circumstance which triggered the warning message 28 can be removed.

Figure 5A:
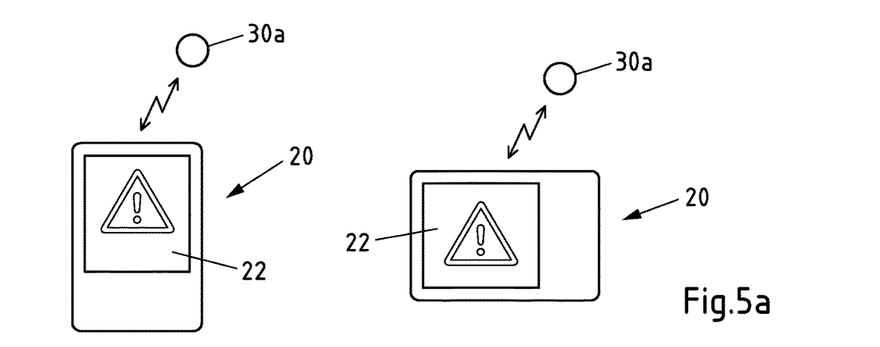
FIGS. 5*a*-*b* a terminal with a user-dependent display.
Figure 5B:
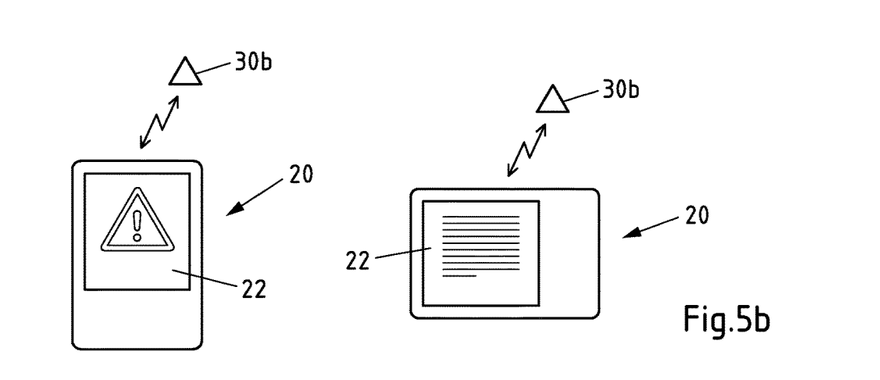

FIGS. 5a and 5b show the display of information on the screen 22 of the terminal 20 dependent on the position and on access authorisations of the operator.

In FIG. 5a, a first operator having an access authorisation of a machine operator is in the vicinity of the terminal 20. The access authorisation is e.g. detected via a transponder reading device (not illustrated), in which a transponder 30a of a machine operator is read.

Following this, the display on the screen 22 is controlled depending on the role of the operator, which by way of example here is a "machine operator". In the example shown, the control is such that if the access authorisation or the role of the operator is a "machine operator", the display on the screen 22 is not changed when the position changes. This is shown in FIG. 5a, in which the same symbol is displayed both in the first alignment (portrait mode) and in the second alignment (landscape mode). That is to say, that in this case only a warning message is output to the operator without detailed information. The operator can subsequently consult a technician qualified for this purpose and call such a person in. This is shown by way of example in FIG. 5b.

FIG. 5b shows that another transponder 30b is in the vicinity of the terminal 20. This other transponder 30b contains e.g. the information that the operator is assigned the role of "service technician". This information is read from the transponder 30b by the terminal 20. In the alignment of the terminal 20 illustrated on the left, the warning message is still output as a symbol on the screen 22. However, if the terminal 20 is now rotated and landscape mode activated, as is illustrated on the right in FIG. 5b, textual information is output. This textual information is, on the one hand, only output as a result of the terminal 20 being in landscape mode and, on the other hand, as a result of the operator being assigned the role of "service technician". Work or operator instructions are provided in the textual information, in order to remove the circumstance causing the error.

Figure 6A:
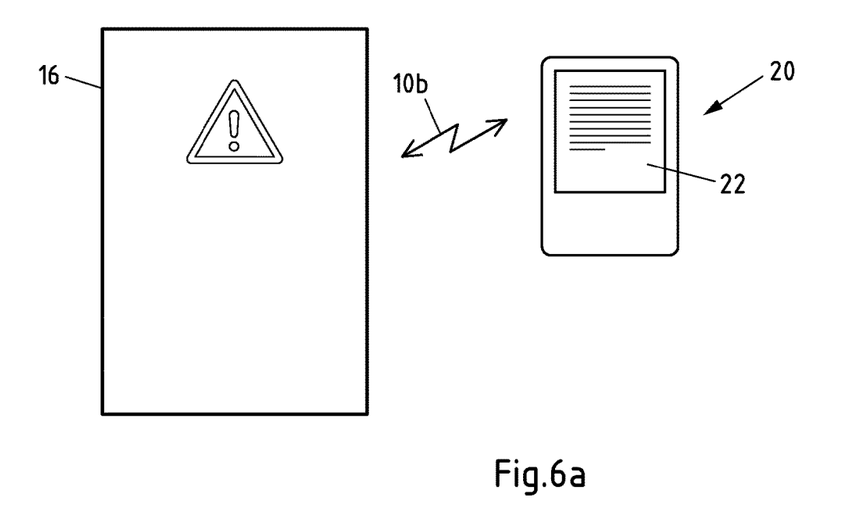
FIGS. 6*a*-*b* a terminal and a viewing glass with position-dependent exchange of information between the terminal and the viewing glass.
Figure 6B:
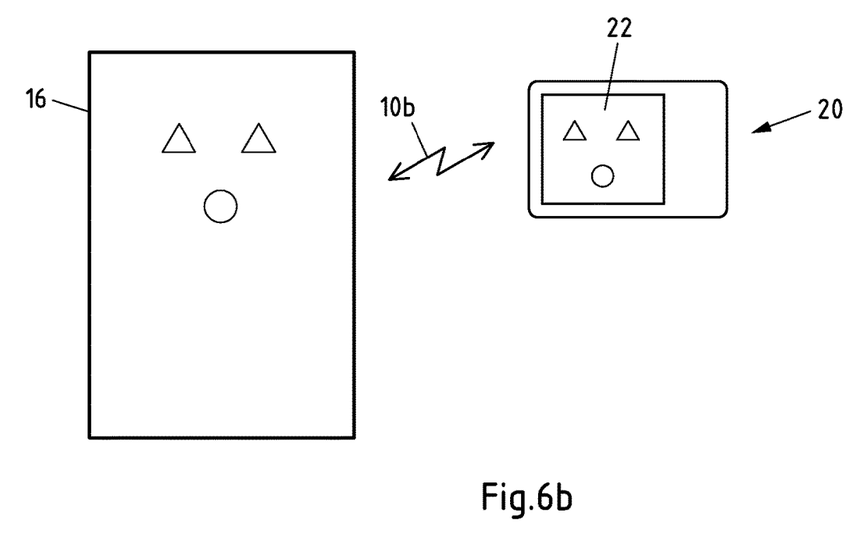

FIGS. 6a and 6b show the possibility of information exchange between a viewing window 16 and a terminal 20 dependent on the alignment information of the terminal 20.

FIG. 6a illustrates a warning message output in the viewing window 16. Corresponding to the warning message in the viewing window 16, information is transmitted to the terminal 20 and a text is output there in portrait mode. This text is semantically associated with the warning message in the viewing window 16.

If the terminal 20 is now rotated and brought into landscape mode, as illustrated in FIG. 6b, an operator instruction appears on the screen 22 of the terminal 20, in particular an operating instruction with visual information for operating the unfolding unit 4. This information can be transmitted by the operator in landscape mode, for example by a gesture or by manipulating a corresponding button, to the viewing window 16 via the communication link 10b.

This transmission of information is in the present case e.g. only possible if the terminal is operated in landscape mode. If the terminal 20 is rotated back again into portrait mode, as is illustrated in FIG. 6a, the content on the screen 22, for example, would change, but this information would then, for example, no longer be able to be transmitted to the viewing window 16 via the communication link 10b.

The operation of the terminal 20 is affected depending on the position or the collected information of the position sensor 26. Thus, on the one hand, the type and the content of the information displayed on the screen 22 vary. On the other hand, it is also possible for an interaction with viewing windows 16 to be dependent on the alignment information. In addition, the information on the screen 22, in particular the content can be varied dependent on an access authorisation and the alignment information.

The embodiments shown are purely exemplary embodiments and various combinations of the indicated functions dependent on the alignment are possible. Examples should therefore not be interpreted as restricting.

The invention claimed is:

1. A terminal for processing facilities, comprising:
   a communication device arranged to exchange information about the processing facility with a communication partner,
   a screen arranged to display the information about the processing facility,
   a position sensor arranged to collect alignment information relating to an alignment of the terminal, and
   a processor arranged to control the communication device, the screen and the position sensor,
   wherein the processor sets a function of the terminal dependent on the alignment information of the position sensor,
   wherein in a first position of the terminal a first function of the terminal is set and in a second position of the terminal a second function, which is different from the first function, is set, and
   wherein the information displayed on the screen is set dependent on information displayed by a display device in a viewing window of a processing station of the processing facility, for intervening in a case of an error and readjustment of erroneous parameters leading to an unwanted outcome,
   wherein the information displayed on the screen includes numeric values, warnings, instructions, and/or messages arranged in such a way that the information displayed on the screen is readable in a comprehensible manner.

2. The terminal of claim 1, wherein the processor sets at least one of a type and a content of the information displayed on the screen about the processing facility dependent on the alignment information from the position sensor.

3. The terminal of claim 1, wherein the functions of the terminal comprise:
   controlling the processing facility,
   viewing facility parameters,
   viewing operator instructions,
   exchanging information with the processing facility.

4. The terminal according to claim 1, wherein the processor, dependent on at least one of an access control and a role of a user currently logged into the terminal, sets the setting of the function of the terminal which is dependent on the alignment information.

5. The terminal according to claim 1, wherein the processor sets access control on the terminal dependent on the alignment information.

6. The terminal according to claim 1, wherein a login device is arranged to receive login information wirelessly.

7. The terminal according to claim 1, wherein the terminal is mobile relative to the processing facility.

8. The terminal according to claim 1, wherein the terminal is at least partly transparent in the area of the screen, and wherein the terminal at least one of has a camera facing away from the screen and displays on the screen at least a picture taken by the camera.

9. The terminal according to claim 1, wherein the information displayed on the screen is set dependent on a relative position of the terminal to the processing facility.

10. The terminal according to claim 1, wherein the communication device is arranged to communicate wirelessly with the processing facility.

11. The terminal according to claim 1, wherein the information displayed on the screen is semantically associated with the information displayed in the viewing window.

12. The terminal according to claim 5, wherein the processor sets remote access via a data network dependent on the alignment information.

13. A system comprising:
    a processing facility comprising at least one processing station, wherein the processing station includes a viewing window and a display device, and wherein the display device is arranged to display information in the viewing window, and
    a terminal for the processing facility, wherein the terminal comprises:
    a communication device arranged to exchange information about the processing facility with a communication partner,
    a screen arranged to display the information about the processing facility,
    a position sensor arranged to collect alignment information relating to an alignment of the terminal, and
    a processor arranged to control the communication device, the screen and the position sensor,
    wherein the processor sets a function of the terminal dependent on the alignment information of the position sensor,
    wherein in a first position of the terminal a first function of the terminal is set and in a second position of the terminal a second function, which is different from the first function, is set, and
    wherein at least one of (i) the processor controls the screen to display the information dependent on the information displayed in the viewing window by the display device and (ii) the display device displays the information in the viewing window dependent on the information displayed on the screen, for intervening in a case of an error and readjustment of erroneous parameters leading to an unwanted outcome,
    wherein the information displayed on the screen includes numeric values, warnings, instructions, and/or messages arranged in such a way that the information displayed on the screen is readable in a comprehensible manner.

14. The system of claim 13, wherein a cover at least partly surrounds the processing facility, and wherein the cover has the at least one viewing window.

15. A method of operating a processing facility, comprising:
    exchanging, with a communication device of a terminal for the processing facility, information about the processing facility with a communication partner;
    displaying, with a screen of the terminal, the information about the processing facility;
    collecting, with a position sensor of the terminal, alignment information relating to an alignment of the terminal;

setting, with a processor of the terminal, a function of the terminal dependent on the alignment information of the position sensor, wherein in a first position of the terminal a first function of the terminal is set and in a second position of the terminal a second function, which is different from the first function, is set, and wherein the information displayed on the screen is set dependent on information displayed by a display device in a viewing window of a processing station of the processing facility, for intervening in a case of an error and readjustment of erroneous parameters leading to an unwanted outcome, wherein the information displayed on the screen includes numeric values, warnings, instructions, and/or messages arranged in such a way that the information displayed on the screen is readable in a comprehensible manner.

16. The method of claim 15, wherein the processing facility is a filling installation.

* * * * *